United States Patent [19]
Shitanaka et al.

[11] Patent Number: 5,949,149
[45] Date of Patent: Sep. 7, 1999

[54] MULTIFUNCTIONAL SWITCHING APPARATUS AND A VEHICLE OPERATING SYSTEM USING THE SAME

[75] Inventors: Hitokazu Shitanaka; Ryoichi Taniuchi; Katsuya Saitou, all of Tsuruga, Japan

[73] Assignee: Matsushita Electric Industrial Co., Ltd., Japan

[21] Appl. No.: 08/899,702

[22] Filed: Jul. 24, 1997

[30] Foreign Application Priority Data

Aug. 1, 1996 [JP] Japan ................................. 8-203364
Jun. 9, 1997 [JP] Japan ................................. 9-150597

[51] Int. Cl.⁶ ................................................. H01H 9/26
[52] U.S. Cl. ........................................... 307/10.1; 200/5 R
[58] Field of Search ............................. 200/1 R, 5 R, 200/61.27, 61.55, 61.57, 61.54; 307/9.1, 10.1, 10.8, 38; 180/6.2, 178; 340/425.5, 438; 315/76–83; 362/37; 359/144

[56] References Cited

U.S. PATENT DOCUMENTS

| | | | |
|---|---|---|---|
| 4,131,772 | 12/1978 | Weckenmann et al. | 200/61.54 |
| 4,219,706 | 8/1980 | Koch et al. | |
| 4,386,279 | 5/1983 | Yoshimi et al. | 200/61.54 |
| 4,578,592 | 3/1986 | Nakazawa et al. | 307/10.1 |
| 4,723,057 | 2/1988 | Lane, Jr. | 200/61.27 |
| 4,772,799 | 9/1988 | Inui et al. | 359/144 |
| 4,792,783 | 12/1988 | Burgess et al. | 340/22 |
| 5,245,142 | 9/1993 | Sacco et al. | 200/5 R |
| 5,270,689 | 12/1993 | Hermann | 345/145 |
| 5,294,759 | 3/1994 | Krehnovi | 200/61.27 |
| 5,335,743 | 8/1994 | Gillbrand et al. | 200/61.54 |
| 5,520,066 | 5/1996 | Tueri | 200/61.54 |

FOREIGN PATENT DOCUMENTS

| | | |
|---|---|---|
| 7 19965 | 1/1977 | France. |
| 2 442 739 | 6/1980 | France. |
| 1 556 179 | 11/1979 | United Kingdom. |
| 2 039 346 | 8/1980 | United Kingdom. |

*Primary Examiner*—Richard T. Elms
*Attorney, Agent, or Firm*—Parkhurst & Wendel, L.L.P.

[57] ABSTRACT

A multifunctional switching apparatus, preferably used as a steering switch, comprises a first switching section selecting a specific combination from a plurality of combinations resulting from any possible combination between operating functions of a second switching section and operating functions of a third switching section. The second and third switching sections are operable independent of each other in the specific combination selected by the first switching section. One operating key is provided to control a plurality of switching sections. A display of the operation key is provided to make the judgement of operational function of each switch section easy.

15 Claims, 10 Drawing Sheets

SELECTED POSITION #1   SELECTED POSITION #2   SELECTED POSITION #3

FIG. 3A
FIG. 3B
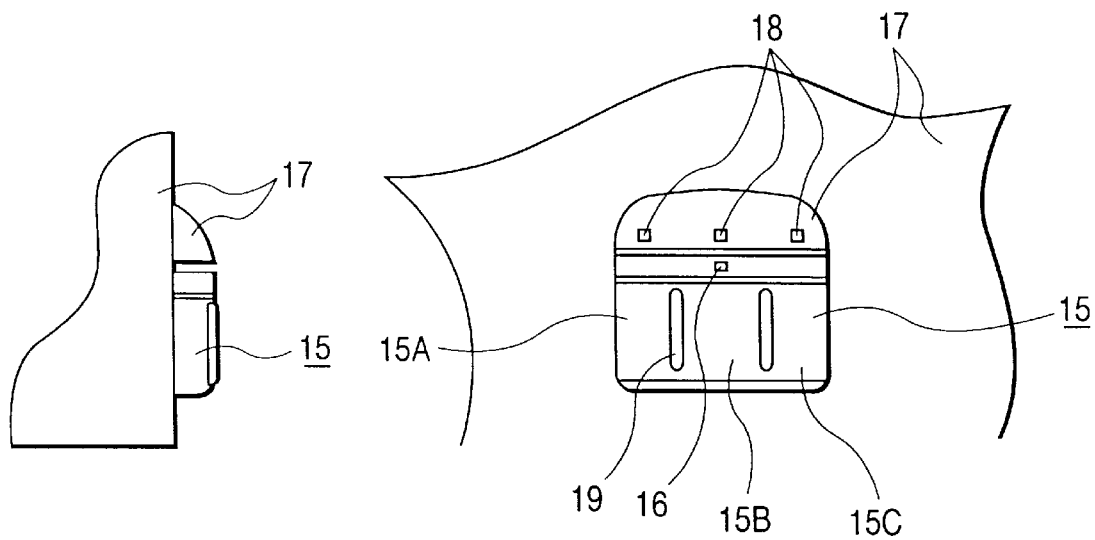
FIG. 3C
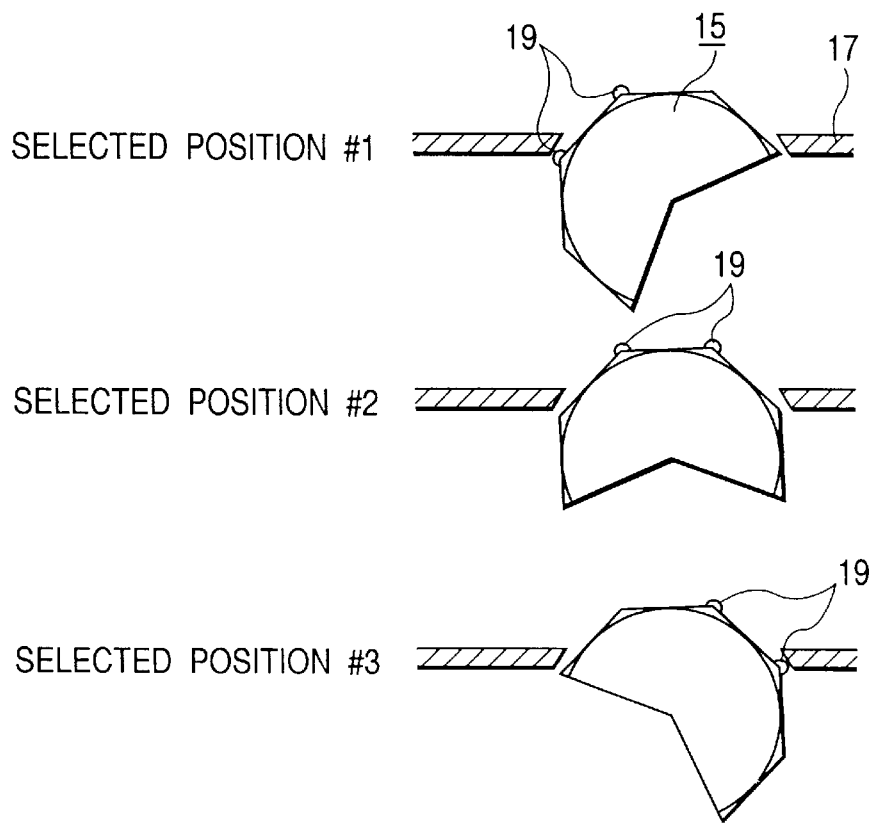

SELECTED POSITION #1

SELECTED POSITION #2

SELECTED POSITION #3

SELECTED POSITION #1

SELECTED POSITION #2

SELECTED POSITION #3

MULTIFUNCTIONAL SWITCHING APPARATUS AND A VEHICLE OPERATING SYSTEM USING THE SAME

BACKGROUND OF THE INVENTION

1. Field of the Invention

The present invention relates to a multifunctional switching, apparatus assigned to a plurality of operating functions, and more particularly to a vehicle operating system using this multifunctional switching apparatus.

2. Prior Art

This type of multifunctional switching apparatus is, for example, incorporated in a vehicle operating system shown in FIGS. 12 and 13.

FIG. 12 is a plan view showing a conventional steering wheel equipped with a steering switch serving as a multifunctional switching operating apparatus. In FIG. 12, reference numeral 2 represents a steering switch constituted by a combination of push switch sections 3 and a seesaw switch section 4 or as a united assembly with a single operating switch. The steering switch 2 is disposed on a steering wheel 1 at an appropriate portion. Thus, the steering switch 2 is easy to operate and good-looking.

FIG. 13 is a circuit block diagram showing details of a conventional steering switch circuit. Resistors 5 and switches 6 are combined. When one switch is closed, a resistance value corresponding to the closed switch is produced for this switch. The output signal thus produced is sent from the steering switch 2 to the switch unit 8 via a connecting section 7. The switch unit 8 is disposed under the steering switch 2. The signal, after entered in the switch unit 8, is divided into a voltage value according to a predetermined ratio determined by a given resistor 9. The closed switch is thus identified according to this voltage value. A control signal, responsive to the closed switch, is sent to a corresponding vehicle device 10. In this manner, the designated vehicle device is remote controlled.

However, according to the above-described conventional multifunctional switching apparatus for the electrically controlled devices mounted in an automotive vehicle, the fundamental circuit arrangement is such that each switch exclusively controls the resistance value of an associated resistor. Thus, one switch is basically dedicated to only one function. In other words, the number of switches to be provided is basically identical with the number of functions required.

To satisfy various needs for the recent trend toward multifunction, a key is to solve a problem of space utility in a layout of all the necessary switches in a limited space. Of course, reducing the size of each operating section is important. If each operating section shares a larger space, a total operational area necessary for an operator to manipulate will become significantly larger. A finger shift amount becomes large with increasing size of the total operational area. This makes the operation difficult.

Such a difficulty is not resolved by an operator's learning of positions of respective operational switches. Identifying each switch by a finger touch was not feasible. Thus, a visual observation by an operator was necessary to confirm each switch when operated.

However, this forces the driver to change his/her eyes' direction from the forward direction to the switch. Enforcing the driver to look at each operating section for manipulating the switch is not desirable, in view of driving safety during a traveling of a vehicle.

Furthermore, the above-described method of combining resistors with switches is realized at a relatively low cost. However, when this method is applied to realize a multifunctional system, a reference voltage needs to be divided finely into smaller fractions to allocate it to numerous switching functions. A problem in dividing the reference voltage so finely is that a voltage range allocated to each function becomes very small. This possibly increases the probability of causing a malfunction of the controlled device by the influence of incoming noise or contact resistance of a connector.

Furthermore, when two or more switches are simultaneously closed, a composite resistance value of respective resistance values of these operated switches is produced. The resultant resistant value thus produced momentarily is different from each resistant value of the operated switches. It possibly results in an erroneous judgement in a vehicle control circuit, leading to a malfunction of the controlled device.

SUMMARY OF THE INVENTION

In view of the foregoing, a principal object of the present invention is to provide an excellent multifunctional switching apparatus which is easy, comfortable and safe in operation and non-expensive in cost even when disposed on or in the vicinity of a steering apparatus, and a related vehicle operating system using this multifunctional switching apparatus.

In order to accomplish the above-described and other related objects, the present invention provides a novel multifunctional switching apparatus comprising a plurality of switching sections mutually related to realize numerous operating functions. One switching section selects a specific combination from a plurality of combinations resulting from any possible combination between operating functions of other switching sections that are operable independent of each other in the selected specific combination. Only one operation key is provided to operate these switching sections. A display of the operation key is provided to make the judgement of operating function of each switching section easy.

According to a vehicle operating system arrangement of tie present invention, a signal corresponding to the operating condition of each switch is transmitted to a receiving section by utilizing an optical communication. This makes it possible to dispose the multifunctional switch to a place easy to operate, assuring comfortable and sure manipulation. Thus, multifunctionality for a vehicle operating system can be easily realized.

More specifically, one aspect of the present invention provides a multifunctional switching apparatus comprising a first switching section means selecting providing a specific combination from a plurality of combinations resulting from any possible combination between operating functions of a second switching section means and operating functions of a third switching section means, and the second and third switching section means being operable independent of each other in the specific combination selected by the first switching section means. With this arrangement, it becomes possible to provide a multifunctional switching apparatus realizing numerous operating functions with a small number of switches.

According to features of preferred embodiments, the first switching section means is a rotary transfer switch, the second switching section means is at push-on switch, and the third switching section means is an up-and-down switch having a neutral position. According to this arrangement, it becomes possible to select operating functions with a small number of switches, as well as execute the selected operation and increase and/or decrease an adjusting amount.

Preferably, the first and second switching section means are incorporated into a rotary transfer switch equipped with a push-on switch operable by a single operation key, and the third switching section means is a seesaw switch having an automatic neutral-returning function. With this arrangement, not only selection and execution of the operating functions are feasible with a small number of operating sections, but also the operation for increasing and/or decreasing the adjusting amount can be simplified.

Preferably, an operation key of the first switching section means has a display section providing functional or indicational display relating to the operating functions of the second or third switching section means. With this arrangement, operations of multifunctional switches can be simplified. And, the currently operated function can be immediately recognized by visual observation.

Preferably, the first switching section means is provided with a touch-sensible projection or marking allowing an operator to confirm a selected position of the operation key. With this arrangement, the selected position of the operation key can be easily confirmed by a finger touch.

Another aspect of the present invention provides a vehicle operating system comprising the above-described multifunctional switching apparatus which is incorporated into a steering apparatus. According to this vehicle operating system, a vehicle's driver can easily control a related vehicle device without releasing his/her hand off the steering apparatus.

Preferably, operating information relating to the multifunctional switching apparatus is judged by a microcomputer. A transmitting section, utilizing an optical communication, is provided in the steering apparatus to transmit a signal. A receiving section, receiving the signal sent from the transmitting section, is provided in a switch unit provided under the steering apparatus. With this arrangement, a signal is transmissible between the steering apparatus and the switch unit without increasing an electrical contact section interposed between them.

Preferably, a connecting case, made of a light-permeable resin, is provided between the steering apparatus and the switch unit disposed under the steering apparatus for accommodating the receiving section. The transmitting section of the steering apparatus transmits the signal to the receiving section of the switch unit by using an infrared ray transmissible through the connecting case. With this arrangement, in an entire rotational range of a steering wheel, a signal transmission is feasible between the steering apparatus and the switch unit without increasing an electrical contact section interposed between them. Furthermore, it becomes possible to surely prevent a malfunction of the operating system caused by other rays.

Alternatively, it is preferable to provide a ring-like light guide made of a light-permeable resin around the connecting case provided between the steering apparatus and the switch unit disposed under the steering apparatus. The transmitting section of the steering apparatus transmits the signal to the receiving section of the switch unit by using infrared ray transmissible through this light guide. With this arrangement, in an entire rotational range of a steering wheel, a reliable and stable signal transmission is realized between the steering apparatus and the switch unit without increasing an electrical contact section interposed between them.

Preferably, the signal received by the receiving section of the switch unit is converted into a signal formatted in compliance with an in-vehicle communication system, and the converted signal is transmitted to each operating device through a communication circuit of the switch unit. This arrangement makes it possible to realize a common signal processing in the receiving section of the switch unit, bringing a significant cost down.

According to another aspect multifunctional switching apparatus, the first switching section means is a rotary transfer switch, the second switching section means is a push-on switch, and the third switching section means is a rotary switch having an automatic neutral-returning function. These first to third switching; sections are disposed coaxially. With this arrangement, not only selection and execution of the operating functions are feasible with a small number of operating sections, but also the operation for increasing and/or decreasing the adjusting amount can be simplified.

Preferably, an operation key of the first switching section means has a display section providing functional or indicational display relating to the operating functions of the second or third switching section means. With this arrangement, operation of multifunctional switches can be simplified. And, the currently operated function can be immediately recognized by visual observation.

Preferably, the first switching section means is provided with a touch-sensible projection or marking allowing an operator to confirm a selected position of the operation key. With this arrangement, the selected position of the operation key can be easily confirmed by a finger touch.

Preferably, still another aspect of the present invention provides a vehicle operating system comprising the above-described another aspect multifunctional switching apparatus which is incorporated into a steering column. According to this vehicle operating system, a vehicle's driver can easily operate a related vehicle device with a relatively smaller hand shaft motion in the same manner as an operation of a light control switch or a wiper control switch disposed on or in the vicinity of a steering column.

BRIEF DESCRIPTION OF THE DRAWINGS

The above and other objects, features and advantages of the present invention will become more apparent from the following detailed description which is to be read in conjunction with the accompanying drawings, in which:

FIG. 3A is a side view showing an arrangement of a first operation key of the steering switch in accordance with the first embodiment of the present invention;

FIG. 3B is a plan view of the first operation key shown in FIG. 3A;

FIG. 3C shows cross-sectional front views showing respective operating positions selectable in accordance with a rotating operation of the first operation key;

DESCRIPTION OF THE PREFERRED EMBODIMENTS

Figure 1:
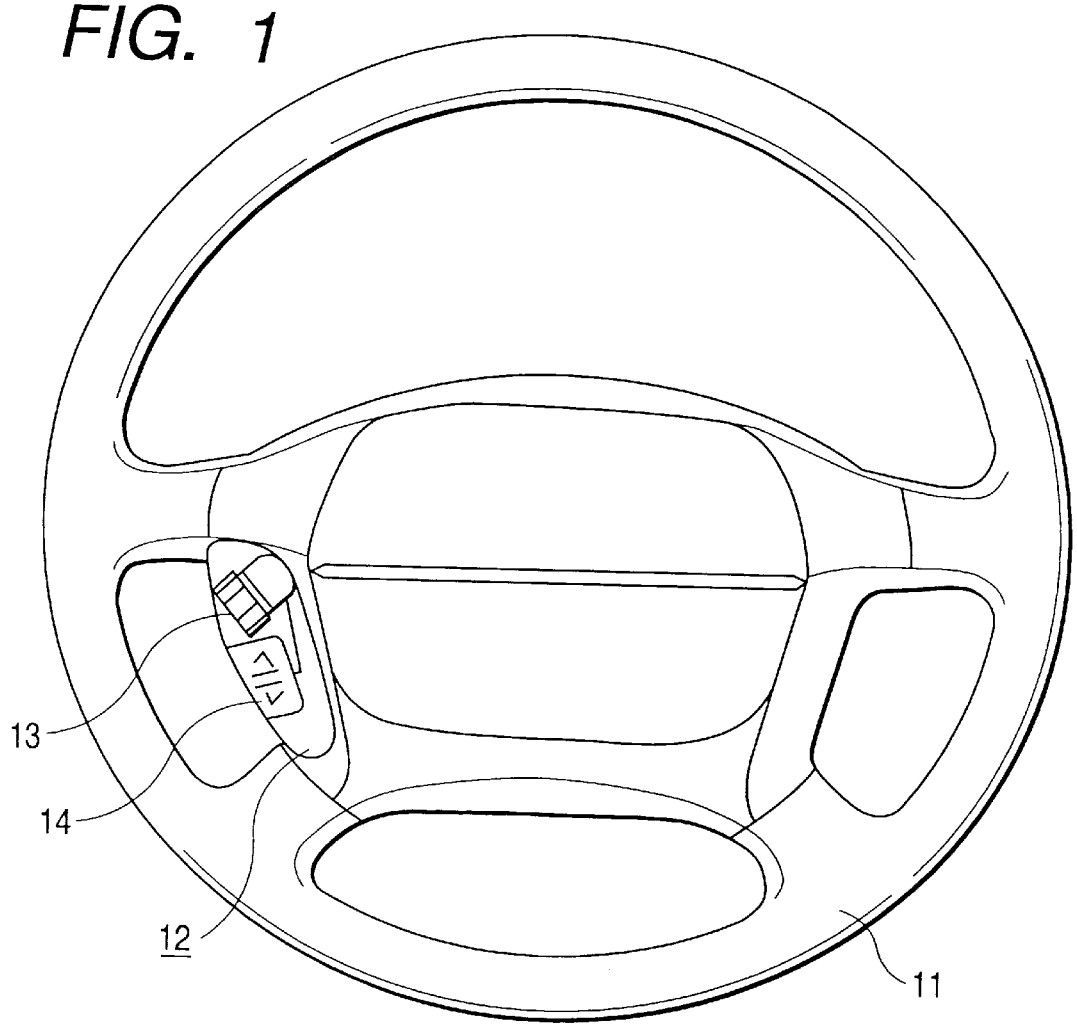
FIG. 1 is a plan view showing a steering equipped with a steering switch serving as a multifunctional switching apparatus in accordance with a first embodiment of the present invention.

Preferred embodiments of the present invention will be explained in more detail with reference to FIGS. 1 through 11 showing a steering switch and a column switch (collectively referred to operation switches) constituting a multifunctional switching apparatus for automotive vehicles. Identical parts are denoted by the same reference numerals throughout the drawing.

First Embodiment

FIG. 1 is a plan view showing a steering wheel equipped with a steering switch serving as a multifunctional switching apparatus in accordance with a first embodiment of the present invention. As shown in FIG. 1, a steering switch 12 is disposed on a steering wheel 11 at an appropriate position considering operability and appearance.

Figure 2:
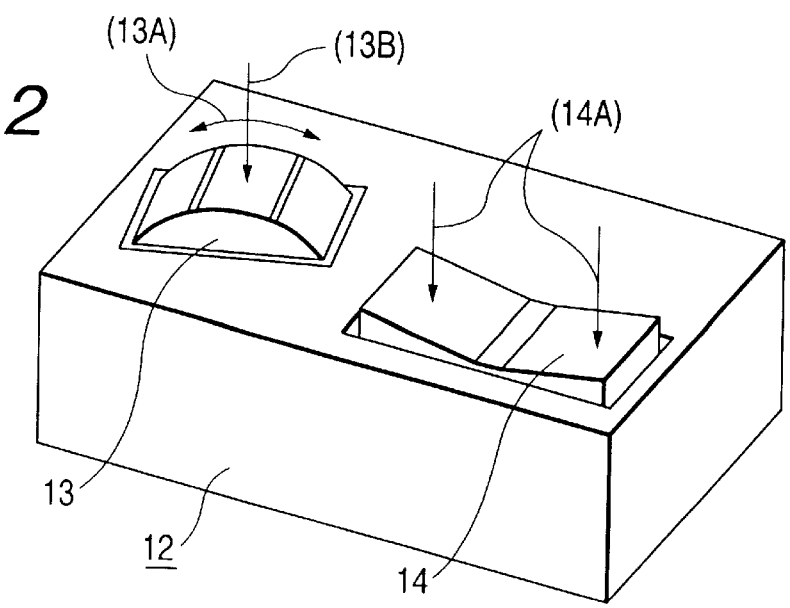
FIG. 2 is a perspective view schematically showing a fundamental arrangement of the steering switch in accordance with the first embodiment of the present invention.

FIG. 2 is a perspective view schematically showing a fundamental arrangement of the steering switch 12. A rotary transfer switch 13A, serving as a first switching section means, is operated or changed over by rotating a first operation key 13 of a circular shape. A push-on switch 13B, serving a second switching section means, is turned on by depressing the first operation key 13 in an up-and-down direction. A seesaw switch 14A, serving as a third switching section means, is associated with a second operation key 14 having an automaticneutral-returning function. The second operation key 14 has opposed ends depressible alternately in an up-and-down direction in a seesaw fashion. In this manner, the steering switch 12 is constituted by a combination of the rotary transfer switch 13A, push-on switch 13B and seesaw switch 14A.

When the steering switch 12 is used, the rotary transfer switch 13A (i.e., the first switching section) selects a specific combination from a plurality of combinations. In this case, the plurality of combinations result from any possible combination between operating functions of the push-on switch 13B (i.e., the second switching section) and operating functions of the seesaw switch 14A (i.e., the third switching section). Details of the plurality of combinations will be described later. The push-on switch 13B and the seesaw switch 14A are operable independent of each other in the specific combination selected by the first switching section means.

A practical structure and operational aspects of each switch can be determined flexibly. For example, Unexamined Japanese Patent Application No. 8-55543, published in 1996 and entitled "Rotary Electronic Component with a Push-button Switch," discloses a preferable arrangement for the rotary transfer switch 13A and push-on switch 13B of the present embodiment. According to this prior art, the operating condition of a switch is changed by rotating a rotary knob of a rotary switch. Meanwhile, the push-on switch is on-and-off controlled by depressing this rotary knob. Regarding a practical structure of the seesaw switch, an arrangement having three positions of up, neutral and down is well known. According to this kind of seesaw switch, the switch is automatically returned to the neutral position. Detailed explanation for these switches will be omitted in the following description.

FIGS. 3A to 3C are views cooperatively showing an arrangement of the first operation key 13 incorporated in the steering switch 12. FIG. 3A is a side view. FIG. 3B is a plan view. FIG. 3C shows cross-sectional front views showing respective operating positions selectable in accordance with a rotating operation of the first operation key 13.

As shown in FIGS. 3A to 3C, the first operation key 13 has an outer cylindrical surface dissected into three display sections 15A to 15C which respectively display printed images corresponding to operating functions of the push-on switch 13B in relation to their selected positions. As described above, the push-on switch 13B serves as the second switching section. An operational content of the seesaw switch 14A, disposed adjacent to this first operation key 13 and serving as the third switching section, is indicated or exhibited by a combination of a pointer 16 and a display section 18. The pointer 16 is provided at an outer cylindrical edge portion of the first operation key 13. The display section 18 is integral with a case 17 of the steering switch 12.

A pair of parallel ridge-like projections 19 and 19, each serving as a finger sign, is provided on the outer cylindrical surface of first operation key 13. A display section 15B, located at a central or intermediate position of three display sections 15A to 15C, is sandwiched between these ridge-like projections 19 and 19. A function of such a finger sign is to let an operator identify a selected combination (or group) of operating functions by finger or hand touch.

According to the present embodiment, three selectable groups are assigned to the first switching section means, considering easiness in the use of this embodiment as a vehicle operating apparatus. However, the number of selectable groups can be increased or decreased flexibly depending on the purpose in the use.

Next, a display method for the first operation key 13 when used as a steering switch will be explained with reference to FIGS. 3A to 3C.

First, the first operation key 13 is rotated to select a group of the rotary transfer switch 13A serving as the first switching section means among selection 1, selection 2 and selection 3. As shown in FIG. 3C, the display sections 15A, 15B and 15C on the outer cylindrical surface of first operation key 13 are successively advanced in the rotational direction of the first operation key 13. Thus, respective operating functions of the push-on switch 13B serving as second switching section means, are displayed in a sequential manner.

At the same time, the pointer 16 provided at the outer cylindrical edge portion of the first operation key 13 is moved in response to a rotational movement of the first operation key 13. The operation content of the seesaw switch 14A, serving as the third switching section means, is thus indicated or exhibited by a combination of the pointer 16 and the display section 18 of case 17.

In this case, one of ridge-like projections 19 and 19 serving as a finger sign protrudes at an upper left position in FIG. 3C in a selected position 1. In this case, as explained above, located between these projections 19 and 19 is the central or intermediate display section 1 5B formed on the outer cylindrical surface of first operation key 13. On the contrary, the other of ridge-like projections 19 and 19 serving as another finger sign protrudes at an upper right position in a selected position 3. A selected position 2 shows an intermediate condition where the central position is selected. In this selected condition 2, both of projections 19 and 19 protrude symmetrically at right and left positions of the outer cylindrical surface of first operation key 13. Differentiating the protruding position and number of projections 19 and 19 in accordance with each selected position of the first operation key 13 makes it possible to recognize or identify the selected position by finger touch.

Figure 4:
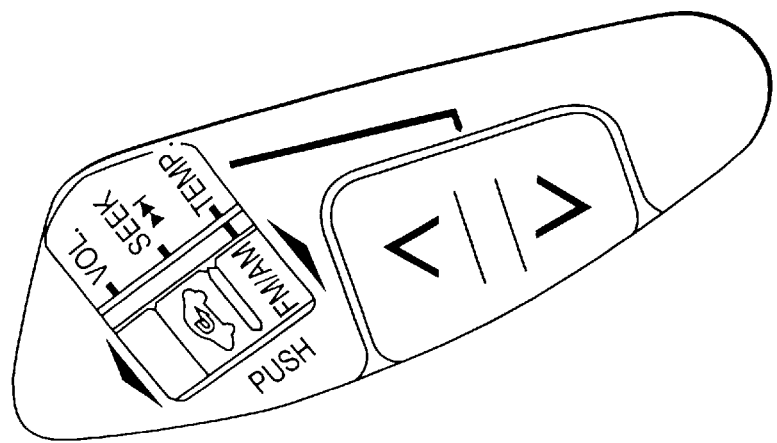
FIG. 4 shows plan views illustrating examples of selected operating positions of the steering switch in accordance with the first embodiment of the present invention.
Figure 4:
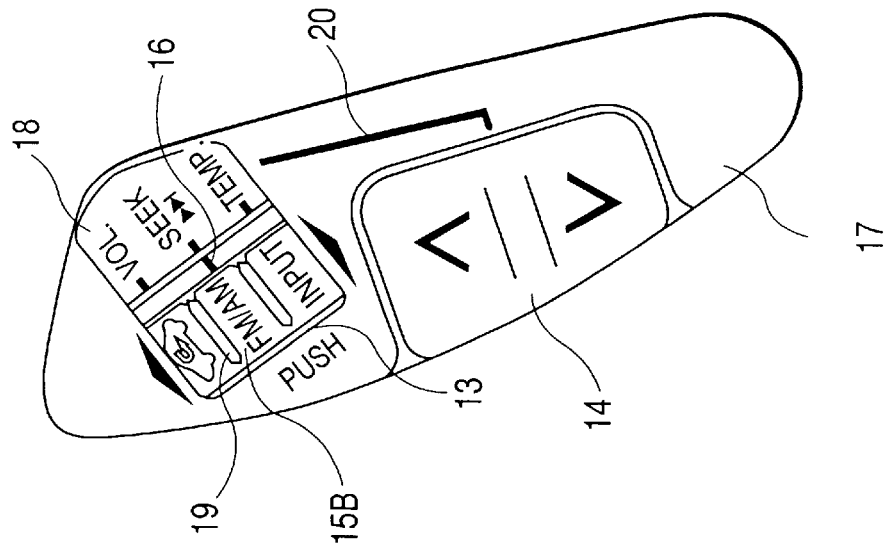
Figure 4:
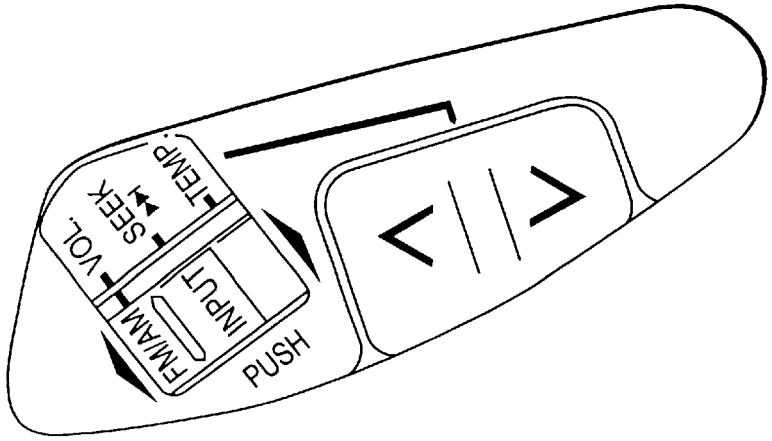

FIG. 4 illustrates examples where the above-described arrangement is applied to operating conditions of an actual steering switch.

At the above-described selected position 1, the second switching section is used to switch the input of an audio device. The third switching section is used to adjust the volume of a speaker. At the selected position 2, the second switching section is used to switch FM/AM of a radio receiver, while the third switching section is used to seek or tune a received frequency. Furthermore, at the selected position 3, the second switching section is used to switch internal/external air for an air-conditioning system, while the third switching section is used to adjust the temperature of the air-conditioning system. These selections are indicated or exhibited by the combination of the display section provided on the outer cylindrical surface of the first operation key 13, the pointer 16 provided at the outer cylindrical edge portion of the first operation key 13, and the display section 18 of case 17.

In FIG. 4, a bold line 20 is used to indicate a correlation that the display section 18 relates to an operating content by the second operation key 14.

According to the embodiment shown in FIG. 4, the operating functions assigned to the second switching section are related to the operating functions assigned to the third switching section. However, it is not a decisive matter. Needless to say, it is possible to combine mutually non-related ones, for example, when the selected group number is limited.

Figure 5:
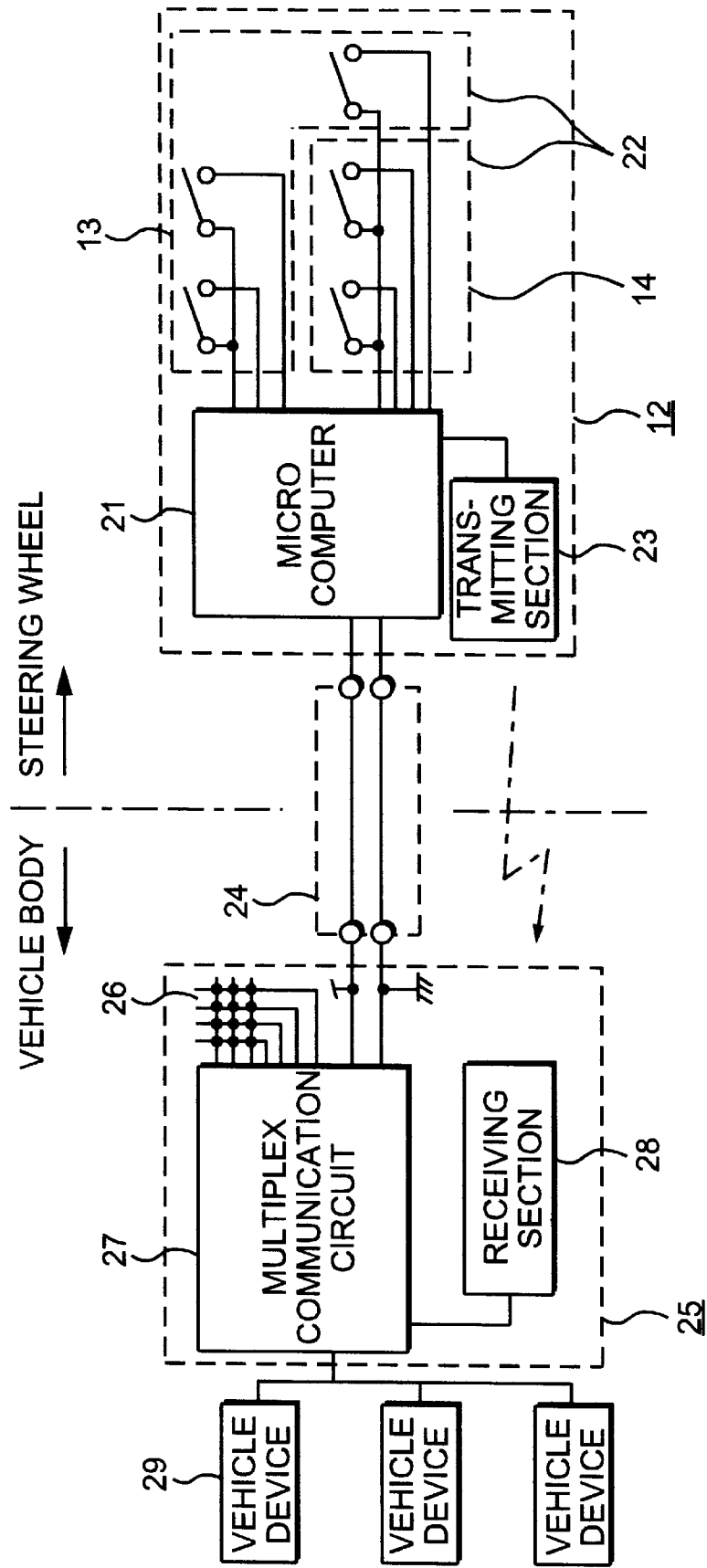
FIG. 5 is a circuit block diagram showing a steering switch circuit and the related peripherals in accordance with the first embodiment of the present invention.

FIG. 5 is a circuit block diagram showing a steering switch circuit and its peripherals in accordance with the first embodiment of the present invention. In the drawing, reference numeral 21 represents a microcomputer disposed in the steering switch 12. This microcomputer 21 detects currently selected positions of the rotary transfer switch 13A and the push-on switch 13B selected by a manipulation of the first operation key 13. Furthermore, the microcomputer 21 detects a currently selected position of the seesaw switch 14A selected by a manipulation of the second operation key 14. The operated position is judged by a key matrix 22. A signal corresponding to the judged operational condition is sent to a transmitting section 23.

A connecting section 24 connects the steering switch 12 and a switch unit 25 disposed under the steering switch 12. The connecting section 24 has a high reliability sufficient for assuring a stable signal transmission related to a safety equipment, such as an air bag.

According to this embodiment, an output signal of microcomputer 21 is transmitted by utilizing an optical communication. At the connecting section 24, the number of used lines is only two for electric power source.

The switch unit 25, provided on a steering column fixed to a vehicle body, is associated with turning indicators, wipers, headlights and the like. According to the prior art, these electric components were controlled directly or by using relays. However, as a recent trend, there is a positive attitude of many auto makers toward eliminating the size and number of signal lines required in the electric wiring. To realize this, a multiplex communication system has been steadily adopted for controlling various electric devices equipped in the vehicle. A multiplex communication circuit 27 is constituted by a key matrix 26 of the turning indicators, wipers, head lights and others.

According to this embodiment, a receiving section 28 is provided for realizing the optical communication. More specifically, a light signal transmitted from the transmitting section 23 of the steering switch 12 is received by the receiving section 28 and converted into an electric signal. The converted electric signal is sent to the multiplex communication circuit 27 and converted into a signal formatted in compliance with an in-vehicle communication system. The formatted signal is then sent to a corresponding vehicle device 29. Thus, each vehicle device 29 is controlled in accordance with a received signal through the optical communication.

With this arrangement, there is no necessity of adding special circuit components to the multiplex communication circuit 27. A vacant board of the microcomputer is effectively used. Any necessary changes can be realized by a modification on the software.

In this case, it is preferable to use infrared ray for the optical communication between the steering switch 12 and the switch unit 25. The infrared ray has a good directivity. No interference will occur between any two vehicles. This is advantageous because there is no necessity of allocating different codes dedicated to each vehicle. Communication format generally used for electronic devices can be applicable to the present embodiment.

Figure 6:
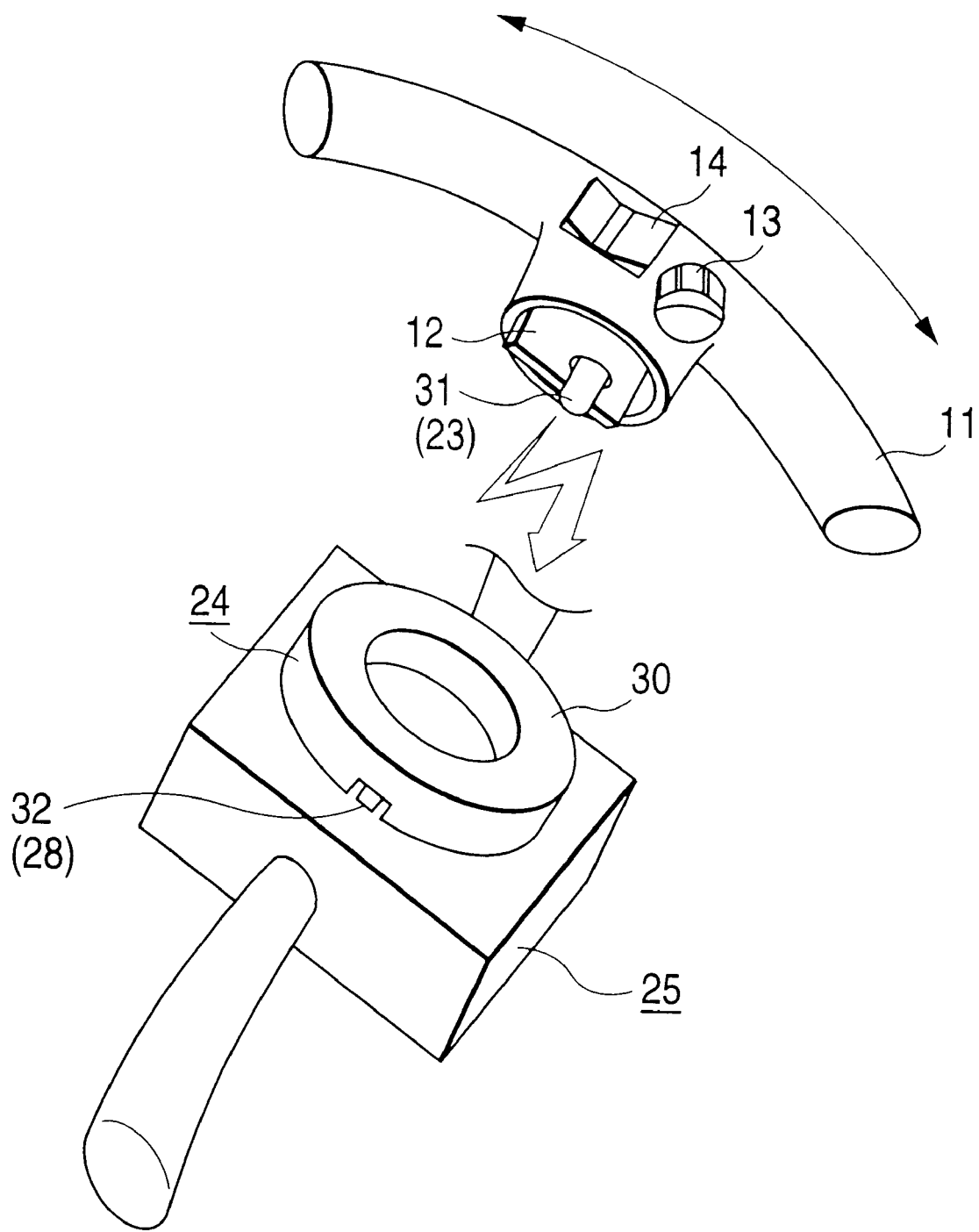
FIG. 6 is a partial perspective view showing an arrangement of an optical communication section in accordance with the first embodiment of the present invention.

FIG. 6 is a partial perspective view showing an arrangement of an optical communication section. In the drawing, the switch unit 25 is fixed to the vehicle body. The connecting section 24, connecting the steering switch 12 and the switch unit 25, is fixed on the upper surface of the switch unit 25. An exterior case 30 of the connecting section 24 is made of a light-permeable resin.

The receiving section 28 for the optical communication is provided in the switch unit 25. The light, emitted from a light-emitting element 1 of the steering switch 12 and permeating through the case 30, is received by the light-receiving element 32. Thus, a light receiving operation is feasible in an entire rotational region of the steering wheel.

Figure 7:
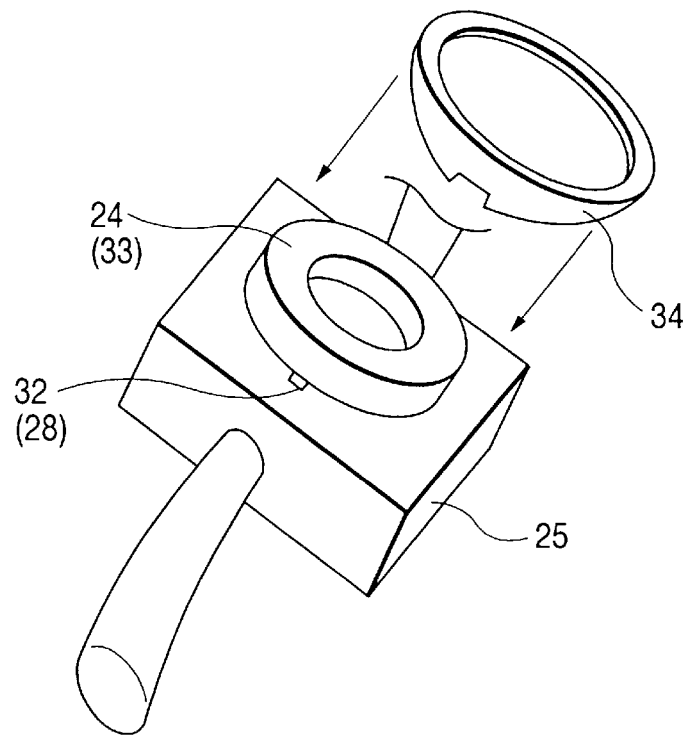
FIG. 7 is a partial perspective view showing another arrangement of the optical communication section in accordance with the first embodiment of the present invention.

FIG. 7 is a partial perspective view showing another arrangement of the optical communication section. A ring-like light guide 34 is attached on the outer cylindrical portion of a case 33 of the connecting section 24. The ring-like light guide 34 is made of a transparent member having a function of collecting or converging the light. According to this arrangement, a stable signal transmission can be realized by using the case 33 that is conventionally available.

Second Embodiment

Figure 8:
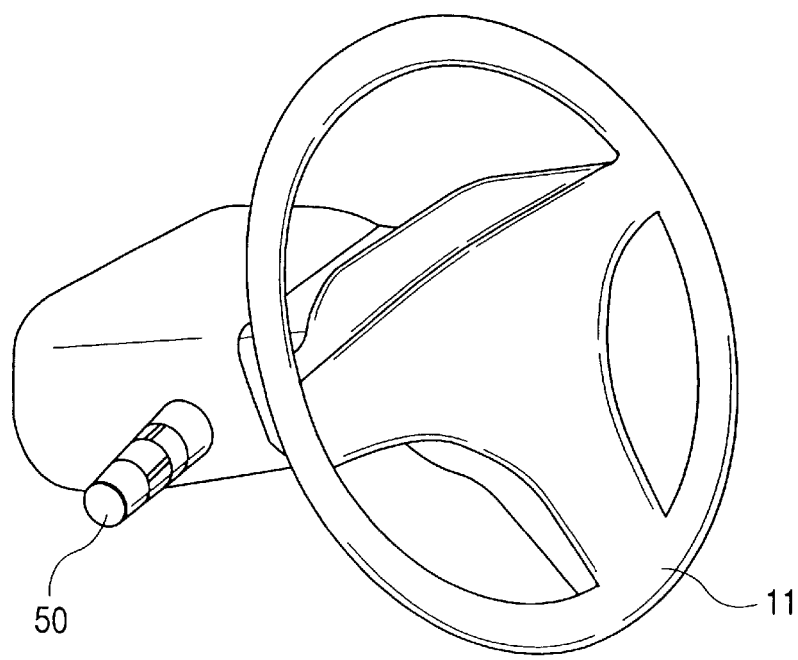
FIG. 8 is a perspective view showing a steering column on which a column switch is installed as a multifunctional switching apparatus in accordance with a second embodiment of the present invention.

FIG. 8 is a perspective view showing a steering column on which a column switch is installed as a multifunctional switching apparatus in accordance with a second embodiment of the present invention. As shown in the drawing, a column switch 50 is disposed on the steering column at an appropriate position considering operability and appearance.

Figure 9:
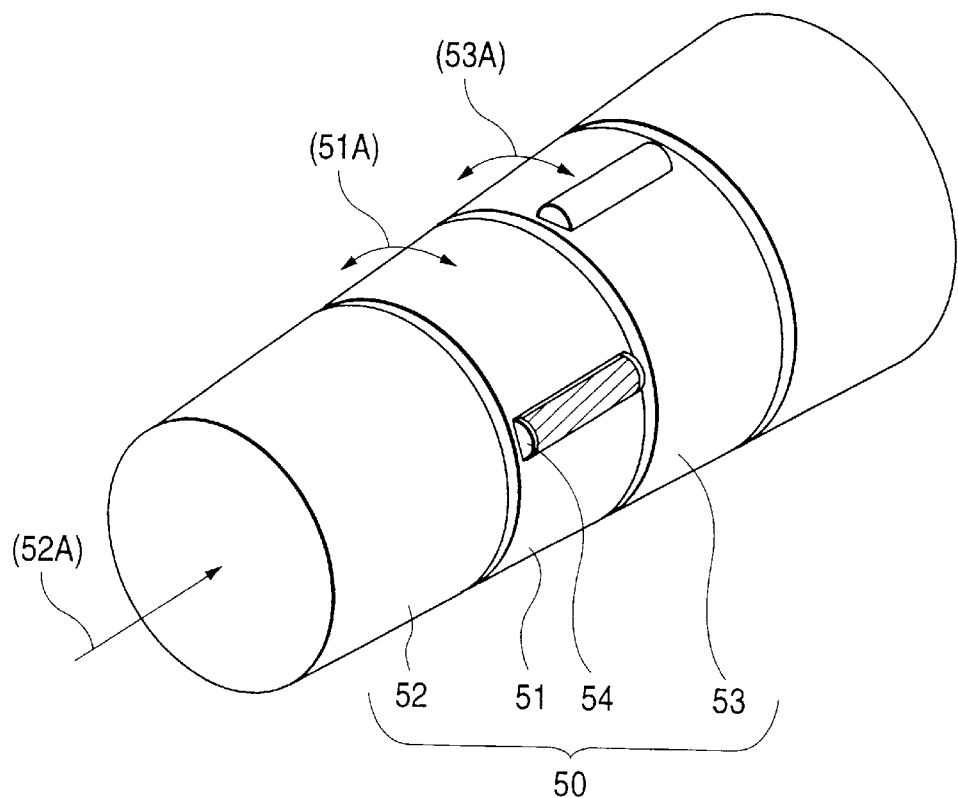
FIG. 9 is a perspective view schematically showing a fundamental arrangement of the column switch in accordance with the second embodiment of the present invention.

FIG. 9 is a perspective view schematically showing a fundamental arrangement of the column switch 50. A rotary transfer switch 51A, serving as a first switching section, is operated or changed over by rotating a first operation key 51 of a cylindrical shape. A push-on switch 52A, serving a second switching section, is turned on by depressing a second operation key 52 in an axial direction thereof. The second operation key 52 has a cylindrical shape with a diameter substantially identical with or slightly smaller than the outer diameter of the first operation key 51. The first operation key 51 is provided at one end of the first switching section coaxially with this first switching section. A rotary switch 53A, having an automatic neutral-returning function, is provided adjacent to the rotary transfer switch 51A. The rotary switch 53A, serving as a third switching section, is operated by rotating a third operation key 53. The third operation key 53 has a cylindrical shape with a diameter substantially identical with or slightly larger than the outer diameter of the first operation key 51. In this manner, the column switch 50 is constituted by a combination of the rotary transfer switch 51 A, push-on switch 52A and rotary switch 53A.

When the column switch 50 is used, the rotary transfer switch 51A (i.e., the first switching section) selects a specific combination (or group) from a plurality of combinations. In this case, the plurality of combinations result from any possible combination between operating functions of the push-on switch 52A (i.e., the second switching section) and operating functions of the rotary switch 53A (i.e., the third switching section). The plurality of combinations are substantially the same as those explained in the first embodiment. The push-on switch 52A and the rotary switch 53A are operable independent of each other in the specific combination selected by the first switching section.

A practical structure and operational aspects of each switch are generally well known. Basically, the rotary transfer switch 51 A is changed over by rotating the rotational operation key. The push-on switch 52A is turned on and off by depressing this operation key in the axial direction. The rotary switch 53A has three (i.e., right, neutral and left) positions and automatically returns the neutral position.

Figure 10:
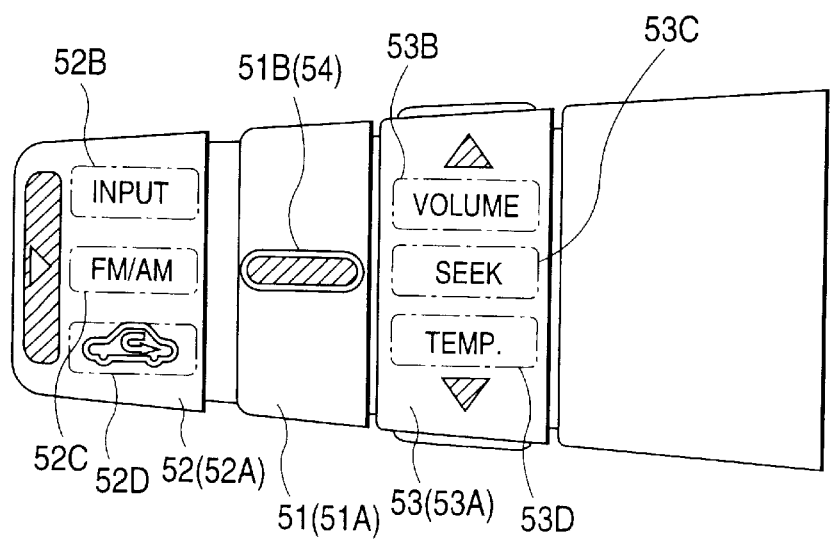
FIG. 10 is a plan view showing practical examples applied to the column switch in accordance with the second embodiment of the present invention.

FIG. 10 shows details of the above-described column switch 50. The first operation key 51, belonging to the first switching section, has an outer cylindrical surface on which a pointer 51B is provided. The second operation key 52, belonging to the second switching section, has an outer cylindrical surface on which a printed display of three sections 52B, 52C and 52D is provided. Three sections 52B, 52C and 52D represent the respective operating functions of push-on switch 52A in relation to each selected position of the first operation key 51. The third operation key 53, belonging to the third switching section, has an outer cylindrical surface on which a printed display of three sections 53B, 53C and 53D is provided. Three sections 53B, 53C and 53D represent the respective operating functions of rotary switch 53A in relation to each selected position of the first operation key 51.

Furthermore, a ridge-like projection 54 is provided on the outer cylindrical surface of the first operation key 51. This projection 54 serves as a finger sign for allowing an operator to recognize or identify a selected combination of the operating functions by finger touch. The position taken by the projection 54 coincides with each of three selected positions 52B, 52C and 52D of the second operation key 52 as well as each of three selected positions 53B, 53C and 53D of the third operation key 53.

Figure 11:
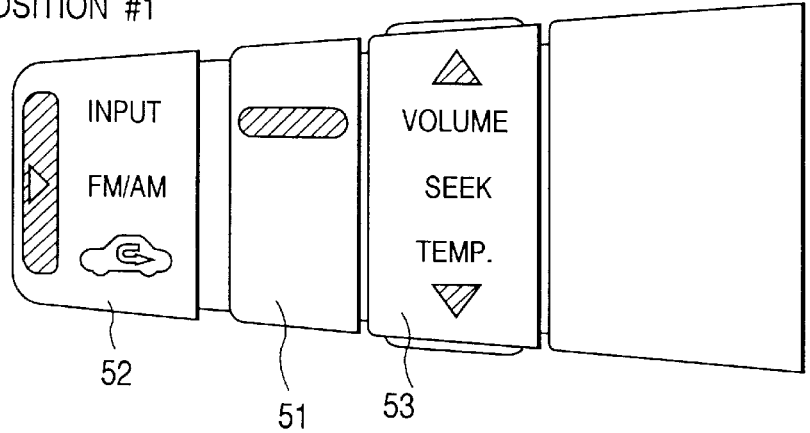
FIG. 11 shows plan views illustrating examples of selected operating positions of the column switch in accordance with the second embodiment of the present invention.
Figure 11:
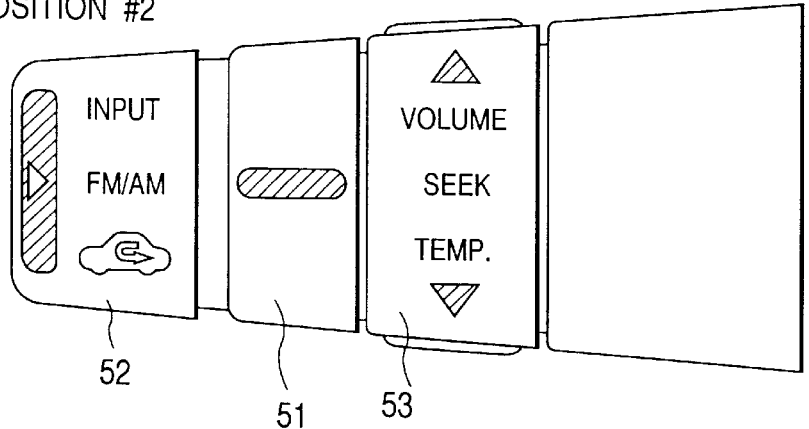
Figure 11:
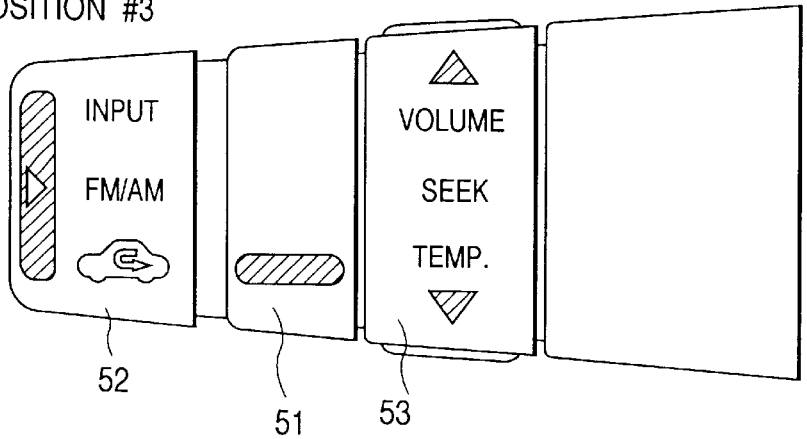
Figure 12:
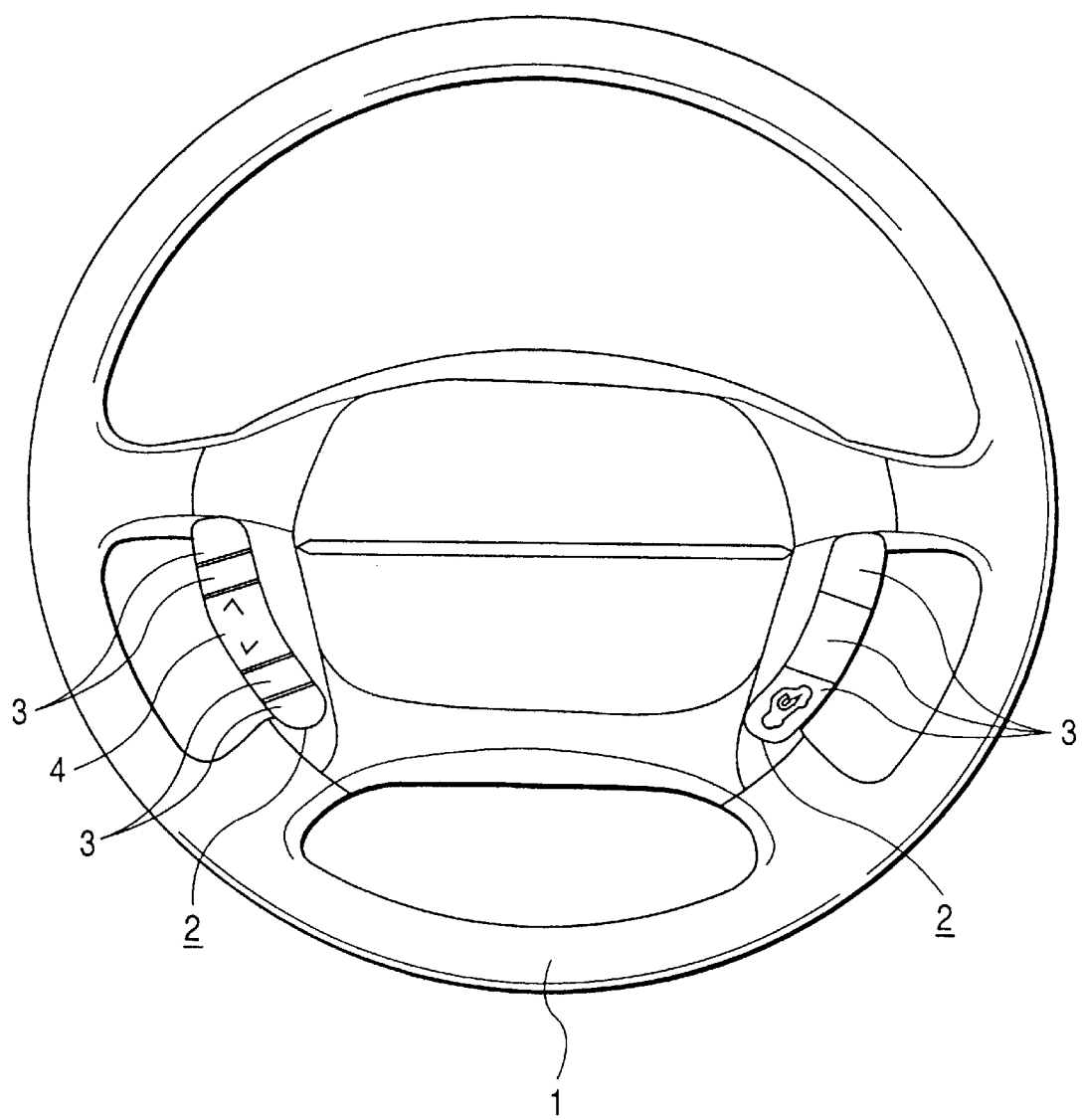
FIG. 12 is a plan view showing a steering wheel equipped with a conventional steering switch.
Figure 13:
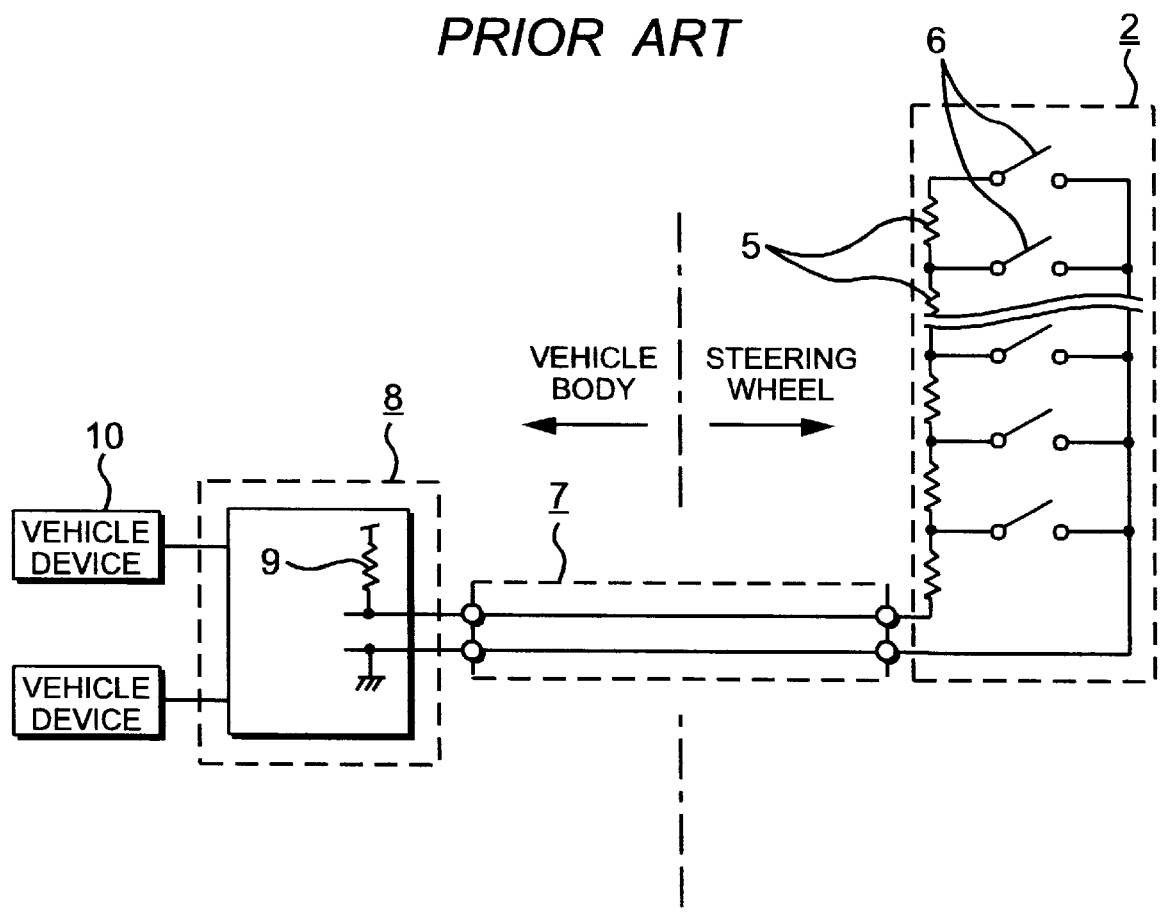
FIG. 13 is a circuit block diagram showing details of the conventional steering switch circuit.

FIG. 11 shows several aspects of an actual operation of the column switch of this embodiment.

At a selected position 1 of the first operation key 51, the second switching section is used to switch the input of an audio device. The third switching section is used to adjust the volume of a speaker. At a selected position 2, the second switching section is used to switch FM/AM of a radio receiver, while the third switching section is used to seek or tune a received frequency. Furthermore, at a selected position 3, the second switching section is used to switch internal/external air for an air-conditioning system, while the third switching section is used to adjust the temperature of the air-conditioning system. These selections are indicated or exhibited by the combination of the pointer 51B provided on the outer cylindrical surface of the first operation key 51, a selected display section 52B, 52C or 52D of the second operation key 52, and a selected display section 53B, 53C or 53D of the third operation key 53.

According to this embodiment, the first switching section comprises a total of three selectable groups for the easiness in the operation of control devices mounted in an automotive vehicle. However, the number of selectable groups can be increased or decreased flexibly depending on the purpose in the use. Furthermore, the column switch 50 can be installed on a console panel instead of the steering column.

As described above, according to the multifunctional switching apparatus of the present invention, the first switching section selects a specific combination from a plurality of combinations resulting from any possible combination between the operating functions of the second switching section and the operating functions of the third switching section. The second and third switching sections are operable independent of each other in the specific combination selected by the first switching section. Numerous operating functions, including an increase/decrease adjustment of a control amount, can be simply and surely controlled. The operating condition can be easily recognized by a visual observation or finger touch. The operating system in accordance with the present invention is practically useful because it is compact in size, easy to use, and non-expensive in cost.

Furthermore, the multifunctional switching apparatus of the present invention can be incorporated as a steering switch in a vehicle. A signal representing an operating condition can be transmitted by utilizing an optical communication. This is advantageous in that the number of required connecting lines needs not be increased compared with that of a conventionally available multifunctional switching apparatus, and in that a malfunction of the system can be effectively eliminated by a reliable signal transmission realized by the optical communication.

As this invention may be embodied in several forms without departing from the spirit of essential characteristics thereof, the present embodiments as described are therefore intended to be only illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

What is claimed is:

1. A multifunctional switching apparatus comprising:

a first switching section means, said first switching section means providing a plurality of selectable positions with each position representing a specific group of functions;

a second switching section means that is selectable from the plurality of selectable positions of said first switching section means; and a third switching section means, said third switching section means being selectable by the plurality of selectable positions of said first switching section means; wherein said second and third switching section means each has a respective plurality of positions that provide a portion of a total combination of positions therebetween;

each individual combination of positions out of the total combination of positions of said second and third switching sections means being actuable from the plurality of selectable positions of said first switching section means; and said second and third switching section means being operable independently of each other in a combination selectable by said first switching section means.

2. The multifunctional switching apparatus in accordance with claim 1, wherein said first switching section means is a rotary transfer switch, said second switching section means is a push-on switch, and said third switching section means is an up-and-down switch having a neutral position.

3. The multifunctional switching apparatus in accordance with claim 1, wherein said first and second switching sections means are incorporated into a rotary transfer switch equipped with a push-on switch operable by a single operation key, and said third switching section means is a seesaw switching section means that is a seesaw switch having an automatic neutral-returning function.

4. The multifunctional switching apparatus in accordance with claim 1, wherein an operation key of said first switching section means has a display section providing functional or indicational display relating to the operating functions of one of said second switching section means and said third switching section means.

5. The multifunctional switching apparatus in accordance with claim 4, wherein said first switching section means is provided with at least one of a touch-sensible projection and a marking allowing an operator to confirm a selected position of said operation key.

6. The multifunctional switching apparatus in accordance with claim 1, wherein said first switching section means is a rotary transfer switch, said second switching section means is a push-on switch, said third switching section means is a rotary switch having an automatic neutral-returning function, and said first to third switching sections are disposed coaxially.

7. The multifunctional switching apparatus in accordance with claim 6, wherein an operation key of said first switching section means has a display section providing functional or indicational display relating to the operating functions of said second or third switching section means.

8. The multifunctional switching apparatus in accordance with claim 7, wherein said first switching section is provided with at least one of a touch-sensible projection and a marking allowing an operator to confirm a selected position of said operation key.

9. A vehicle operating system comprising:

a multifunctional switching apparatus incorporated into a steering apparatus; said multifunctional switching apparatus comprising:

a first switching section means, said first switching section means providing a plurality of selectable positions with each position representing a specific group of functions;

a second switching section means that is selectable from the plurality of selectable positions of said first switching section means; and a third switching section means, said third switching section means being selectable by the plurality of selectable positions of said first switching section means; wherein said second and third switching section means each has a respective plurality of positions that provides a portion of a total combination or positions therebetween;

each individual combination of positions out of the total combination of positions of said second and third switching sections means being actuable from the plurality of selectable positions of said first switching section means; and said second and third switching section means being operable independently of each other in a combination selectable by said first switching section means.

10. The vehicle operating system in accordance with claim 9, wherein operating information relating to said multifunctional switching apparatus is judged by a microcomputer, a transmitting section utilizing an optical communication is provided in said steering apparatus to transmit a signal, and a receiving section receiving the signal sent from said transmitting section is provided in a switch unit provided under said steering apparatus.

11. The vehicle operating system in accordance with claim 10, wherein a connecting case made of a light-permeable resin is provided between said steering apparatus and said switch unit disposed under said steering apparatus for accommodating said receiving section, and said transmitting section of said steering apparatus transmits the signal to said receiving section of said switch unit by using infrared ray transmissible through said connecting case.

12. The vehicle operating system in accordance with claim 10, wherein a ring-like light guide made of a light-permeable resin is provided around a connecting case provided between said steering apparatus and said switch unit disposed under said steering apparatus, and said transmitting section of said steering apparatus transmits the signal to said receiving section of said switch unit by using infrared ray transmissible through said light guide.

13. The vehicle operating system in accordance with claim 10, wherein the signal received by said receiving section of said switch unit is converted into a signal formatted in compliance with an in-vehicle communication system, and said converted signal is transmitted to each operating device through a communication circuit of said switch unit.

14. A vehicle operating system comprising:

a multifunctional switching apparatus incorporated into a steering column, said multifunctional switching apparatus comprising:

a first switching section means, said first switching section means providing a plurality of selectable positions with each position representing a specific group of functions;

a second switching section means that is selectable from the plurality of selectable positions of said first switching section means; and a third switching section means, said third switching section means being selectable by the plurality of selectable positions of said first switching section means; wherein said second and third switching section means each has a respective plurality of positions that provides a portion of a total combination or positions therebetween;

each individual combination of positions out of the total combination of positions of said second and third switching sections means being actuable from the plurality of selectable positions of said first switching section means; and said second and third switching section means being operable independently of each other in a combination selectable by said first switching section means.

15. The vehicle operating system in accordance with claim 14, wherein said first switching section means is a rotary transfer switch, said second switching section means is a push-on switch, said third switching section means is a rotary switch having an automatic neutral-returning function, and said first to third switching sections are disposed coaxially.

* * * * *